United States Patent [19]

Greenfield

[11] Patent Number: 5,346,238
[45] Date of Patent: Sep. 13, 1994

[54] PORTABLE REMOVABLE BICYCLE STAND

[75] Inventor: Peter Greenfield, Freeport, N.Y.

[73] Assignee: Greenfield Industries, Inc., Freeport, N.Y.

[21] Appl. No.: 73,734

[22] Filed: Jun. 8, 1993

[51] Int. Cl.⁵ .............................................. B62H 1/00
[52] U.S. Cl. .................................................. 280/293
[58] Field of Search ............... 280/291, 293, 294, 295, 280/296, 297, 298, 301, 304, 300

[56] References Cited

U.S. PATENT DOCUMENTS

| | | | |
|---|---|---|---|
| 23,792 | 11/1899 | Jones | 280/293 |
| 580,544 | 4/1897 | Brown | 280/294 X |
| 593,521 | 11/1897 | Fowler | 280/293 X |
| 615,612 | 12/1898 | Dunham | 280/294 |
| 617,028 | 1/1899 | Koehler | 280/294 |
| 1,227,390 | 5/1917 | Cook | 280/293 |
| 3,712,637 | 1/1973 | Townsend | 280/293 |
| 3,980,320 | 9/1976 | Marchello | 280/293 |
| 4,591,180 | 5/1986 | Copple | 280/293 |
| 4,971,346 | 11/1990 | Fales, III et al. | 280/293 |

FOREIGN PATENT DOCUMENTS

| | | | |
|---|---|---|---|
| 1064321 | 10/1952 | France | 280/293 |
| 0005577 | 2/1894 | Sweden | 280/293 |

Primary Examiner—Margaret A. Focarino
Assistant Examiner—Florian Zeender
Attorney, Agent, or Firm—Galgano & Burke

[57] ABSTRACT

A stand for a bicycle that supports it at an angle. The stand includes a single elongated member which attaches to the bicycle at two locations by means of a slotted member which encircles the crank spindle and a yokeless shoulder member which supports a chain stay to support the bicycle. The opposite end of the elongated member serves to contact the ground. The stand is readily installed and removed, and is stored in a second location on the bicycle when the bicycle is in use.

7 Claims, 4 Drawing Sheets

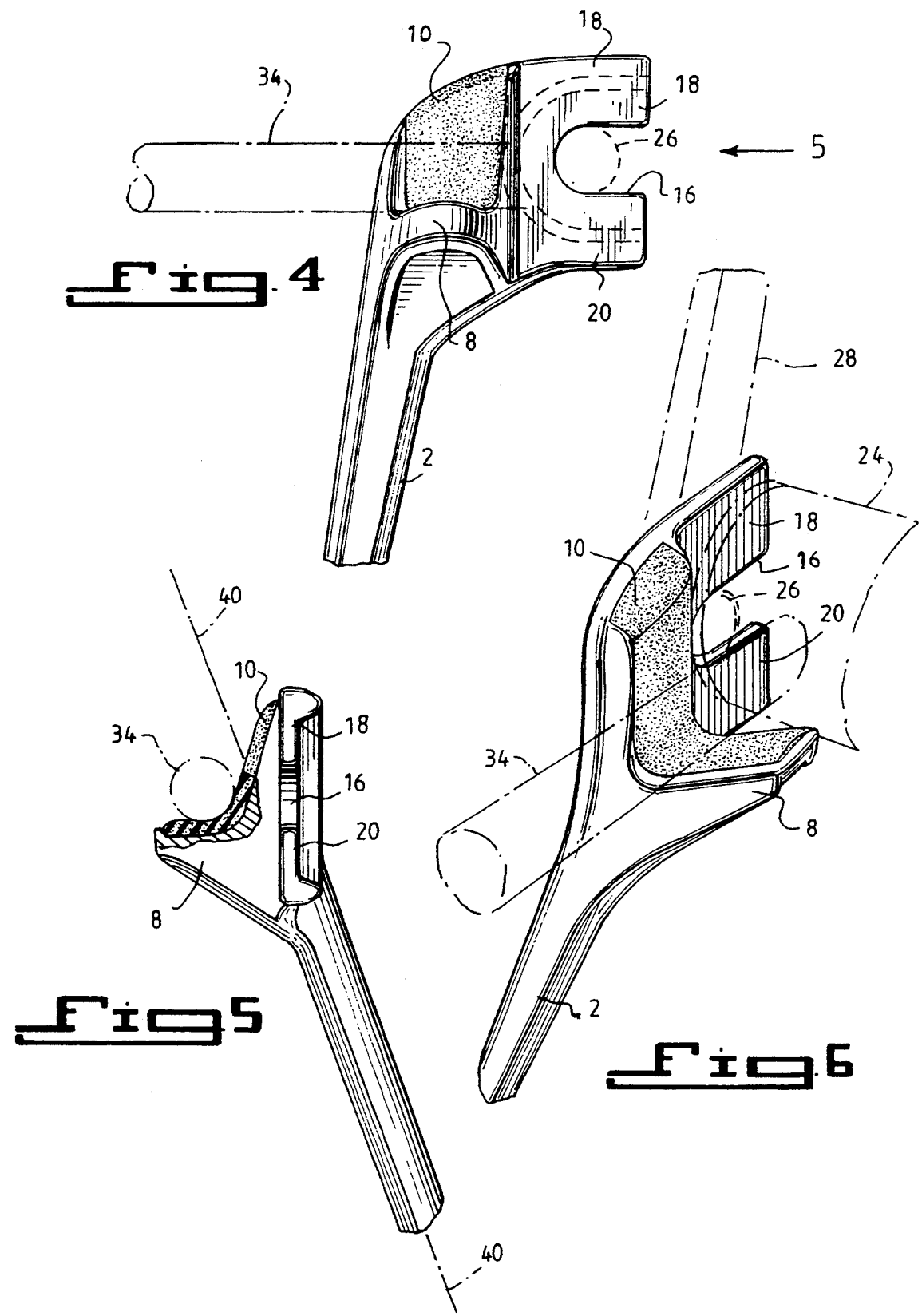

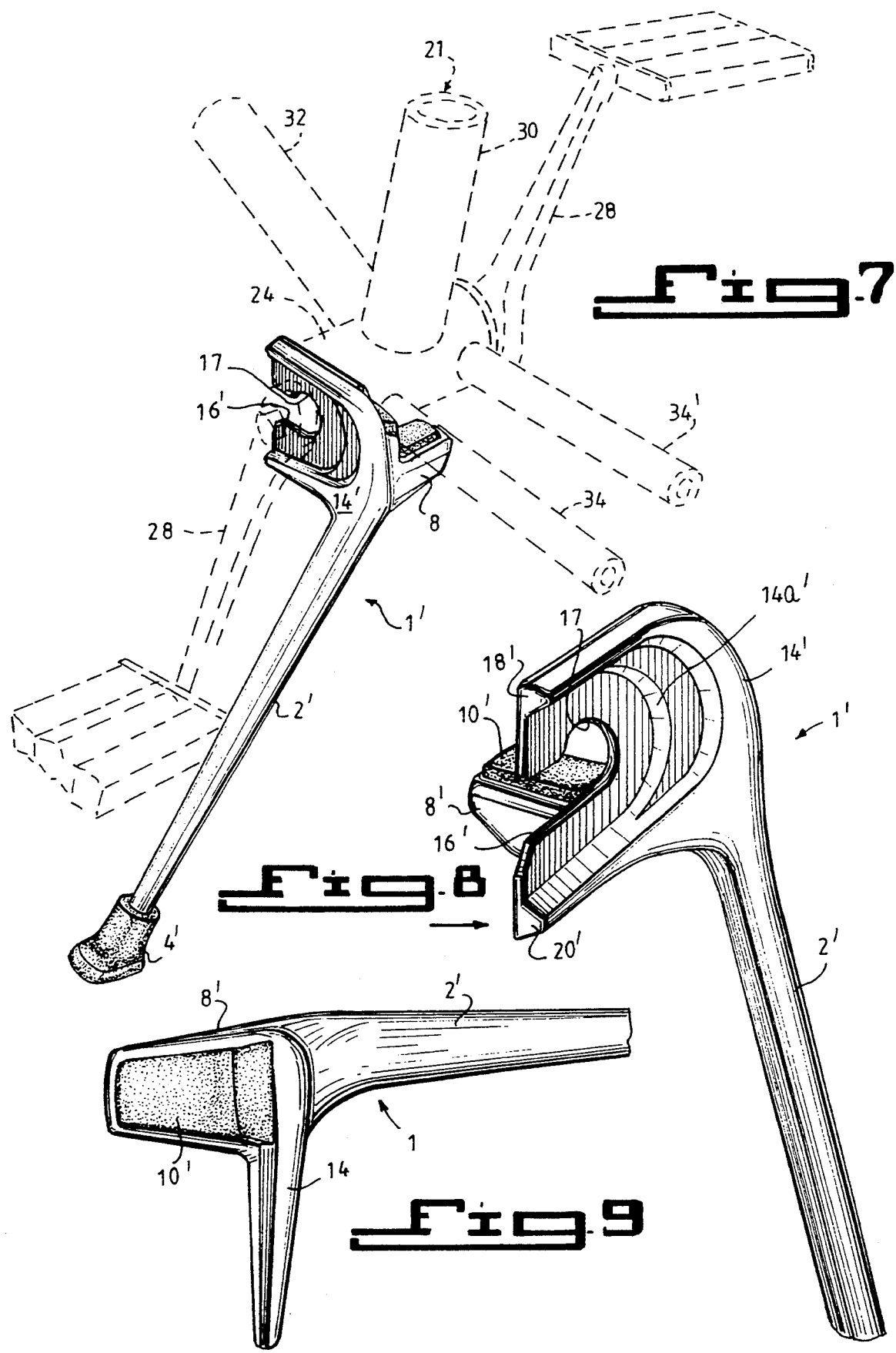

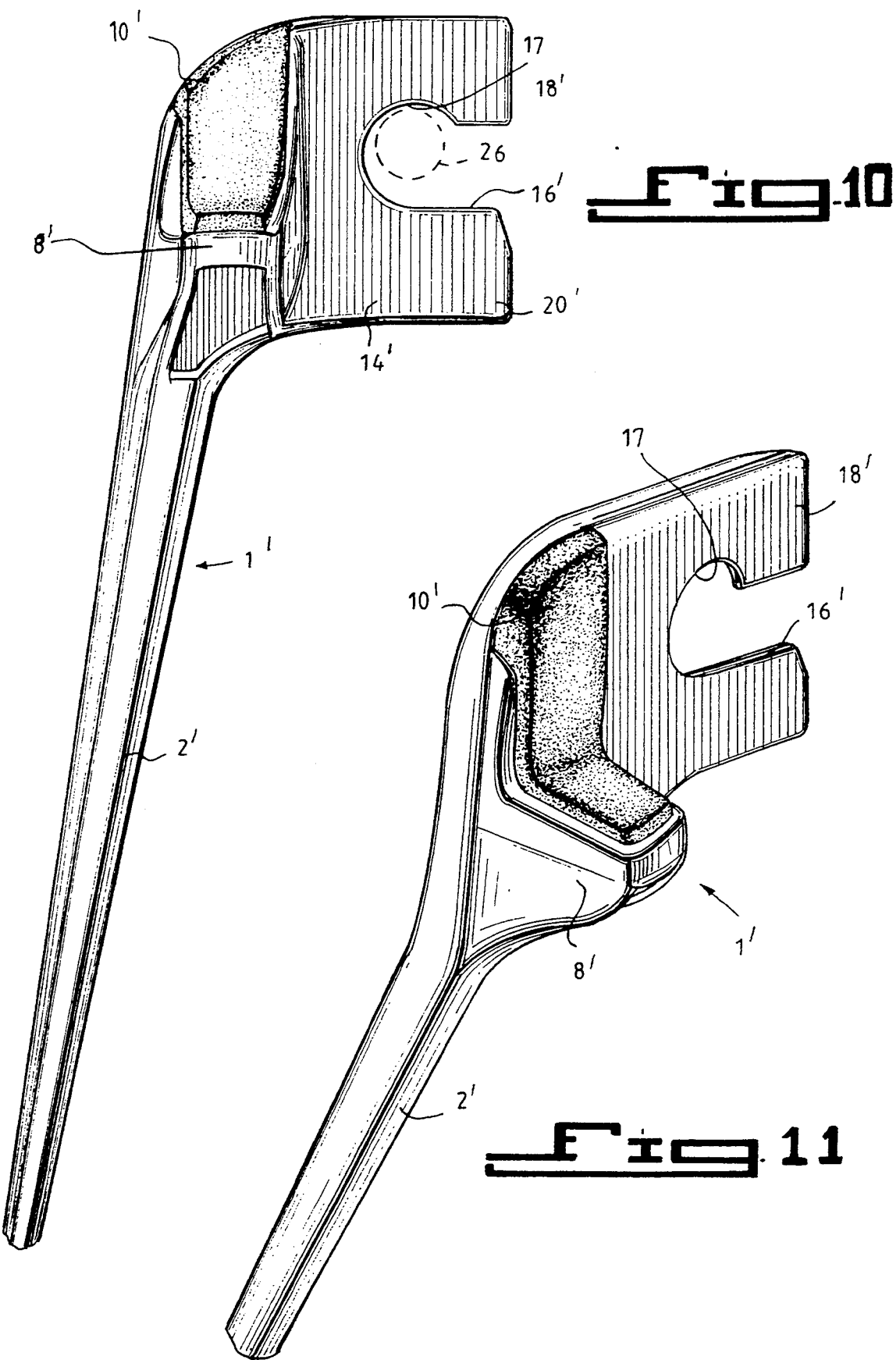

PORTABLE REMOVABLE BICYCLE STAND

BACKGROUND OF THE INVENTION

1. Field of the Invention

This invention relates generally to supports or stands for two-wheeled vehicles such as bicycles. More particularly, it relates to an improved stand that is retained in its use position by the weight of the supported vehicle, without the need for any disparate fastening means.

2. The Prior Art

Stands to support bicycles in an upright position relative to the ground are as old as the bicycle itself, and in a general way, can be divided into broad categories: stands which have a wide footprint to support the bicycle in an upright position with one wheel generally off the ground; and single-legged stands upon which the bicycle leans, stability being maintained by both wheels and the foot of the stand, in a three-point manner.

One form of the single-legged stand is the kickstand, which is permanently fastened to the bicycle frame, and adapted to swing down into an earth-contacting position and held in place by a spring-loaded detent. The bicycle leans on the stand which supports it. Raising the bicycle to a vertical position permits the stand to be pivotally displaced to a horizontal storage position. This action is achieved by directly kicking the stand or peddling the bicycle, and the stand is retained in the stowed position by a further detent.

The recent popularity of the so-called mountain bicycles designed for use in off-road locations has created a need for a stand which can be removed and stored safety elsewhere on the bicycle, as the classic kickstand is regarded as hazardous in an off-road environment.

Of the above two classes of bicycle stands, certain types are designed so as to be removable and portable. They can be removed from the bicycle and stored in a remote location, but are cumbersome and awkward to carry.

Removable, portable bicycle stands are exemplified in many prior art patents, such as the following:

U.S. Pat. No. 747,449, issued to Longbottom, describes a bicycle support consisting of a straight member with projections on its upper end that fits between the chain, stays on a bicycle frame and extends to the ground when in use, positioned at an angle with respect to the plane of the bicycle frame. The projections on the member engage the chain stays to retain the member in place against the weight of the bicycle.

U.S. Pat. No. 1,227,390, to Cook, discloses a bicycle attachment comprising an elongated bar formed from wire or rod, which is positioned between the chain stays at an angle to the bicycle frame, retained in place by a curved upper end which encircles one chain stay, the lower end of the bar being in contact with the ground. The bar is retained in place by friction against the chain stay, the friction being created by the weight of the bicycle against the bar.

U.S. Pat. No. 3,712,637, to Townsend, discloses a generally L-shaped cycle stand of the center stand variety which supports a bicycle with one wheel off the ground.

U.S. Pat. No. 3,910,603, to Shipman, discloses a bicycle side stand comprising a removable rod extending laterally from the bicycle to the ground, being held in place by a bracket mounted on the bicycle frame.

U.S. Pat. No. 4,591,180, to Copple, discloses a bicycle stand comprising a single elongated support leg mounted on the bicycle frame in a first support position, with a cooperating finger and thumb which encircle both chain stays to hold the stand in place. The stand is removable and is adapted to be stored on the bicycle frame in a second storage position.

Notwithstanding these disclosures, all removable bicycle stands of the single-member variety do not provide adequate support in the direction of bicycle motion. Simply pushing on the bicycle in the direction of motion is usually sufficient to release the stand, toppling the bicycle. U.S. Pat. No. 4,971,346, to Fales, III, et al, discloses a portable bicycle stand which serves to prevent this toppling by providing supporting means in two directions—longitudinally along the bicycle's axis and laterally to it. This is accomplished by the provision of two generally U-shaped, yoke-like members on the stand displaced approximately 90 degrees with respect to one another, which encompass and captively engage the bicycle frame. While entirely functional, the two yoke-like members are not universally adapted to all bicycle frames, and therefore, the yoke dimensions, especially for the leg cut out which engages the chain stay tube (see column 3, lines 33–35), are of particular importance and concern.

SUMMARY OF THE INVENTION

Accordingly, the primary object of the present invention is to provide an improved single-member bicycle stand which can be readily attached to and removed from the frame of a bicycle, and which fits a wide variety of bicycles without adaptation.

It is a further object to provide the bicycle stand which requires only one yoke member to encompass and captively engage the bicycle, which supports it against tripping and prevents forward or backward rolling motion.

It is still another object to provide a stand which, once installed, is held in place by the weight of the bicycle against it without additional clamps or latches.

It is yet another object to provide a stand which is readily stored on the bicycle in a second position.

It is a further object to provide a stand which is easily portable and convenient to carry.

Certain of the foregoing and related objects of the invention are readily attained in a portable stand for a bicycle which includes an elongated member having an upper portion and lower portion, the former of which has first and second bicycle support means. The first bicycle support means includes a planar tab extending laterally from the elongated member and having a slot therein which engages about the crank spindle of the bicycle. The planar tab is disposed essentially parallel to the plane of the bicycle frame when engaged about the bicycle crank spindle. The second support means comprising a shoulder element which engages and supports thereon a chain stay tube on the bicycle. The shoulder element extends from the elongated member at a substantially 90 degree offset from the plane of the tab. The combined engagement of the first and second support means by a bicycle serves to transfer the weight of the bicycle to the elongated member and thence to the ground therebeneath.

Preferably, the stand comprises a rigid, unitary member. Advantageously, the planar tab projects radially from the elongated member and the tab slot is bounded by a recessed, U-shaped tab inner face. Most advantageously, the slot has a "dog-leg" like profile. Desirably, the plane of the planar tab is disposed between 25 to 35 degrees relative to the longitudinal axis of the elongated member.

In a particularly preferred embodiment of the invention, the shoulder is generally L-shaped and a generally L-shaped cushion is mounted on the shoulder. Most advantageously, the L-shaped shoulder has a recessed dove-tail shaped channel in which the L-shaped cushion is mounted in a friction-fit manner.

With these and other objects in view, which will more readily appear as the nature of the invention is better understood, the invention consists in the novel construction, combination and assembly of parts hereinafter more fully described, illustrated and claimed with reference being made to the attached drawings.

BRIEF DESCRIPTION OF THE DRAWINGS

Similar reference characters designate corresponding parts throughout the several figures of the drawings, wherein:

FIG. 4 is an enlarged, fragmentarily-illustrated, rear side elevational view of the bicycle stand, further showing the bicycle stand in phantom-line;

FIG. 5 is an enlarged, fragmentarily-illustrated, elevational view, in part section, of the bicycle stand taken in the direction of arrow 5 in FIG. 4;

FIG. 6 is an enlarged, fragmentarily-illustrated, perspective view of the bicycle stand, further showing the bicycle in phantom-line; and FIG. 7 is a perspective view of a further embodiment of the present invention installed on a bicycle, shown in phantom line;

FIG. 8 is an enlarged, fragmentarily-illustrated, front perspective view of the bike stand of FIG. 7;

FIG. 9 is a plan view of the bike stand shown in FIG. 8;

FIG. 10 is a rear elevational view of the bike stand of FIG. 7; and

FIG. 11 is a rear perspective view of the bike stand of FIG. 7.

DETAILED DESCRIPTION OF THE PREFERRED EMBODIMENTS.

Figure 1:
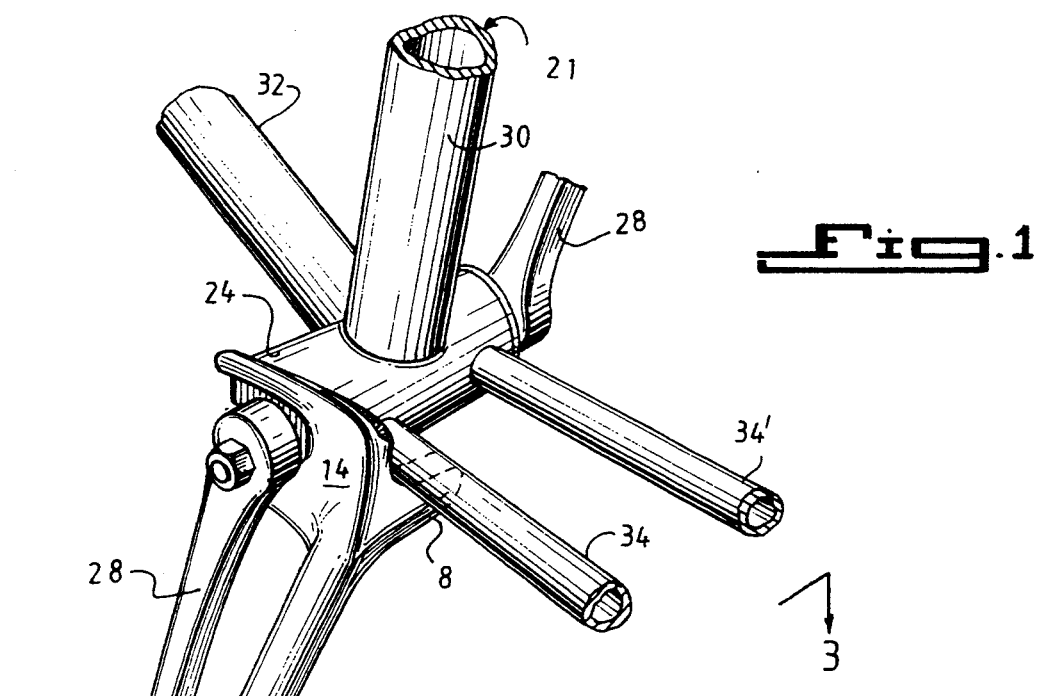
FIG. 1 is a perspective view of the bicycle stand of the present invention installed on a bicycle.
Figure 2:
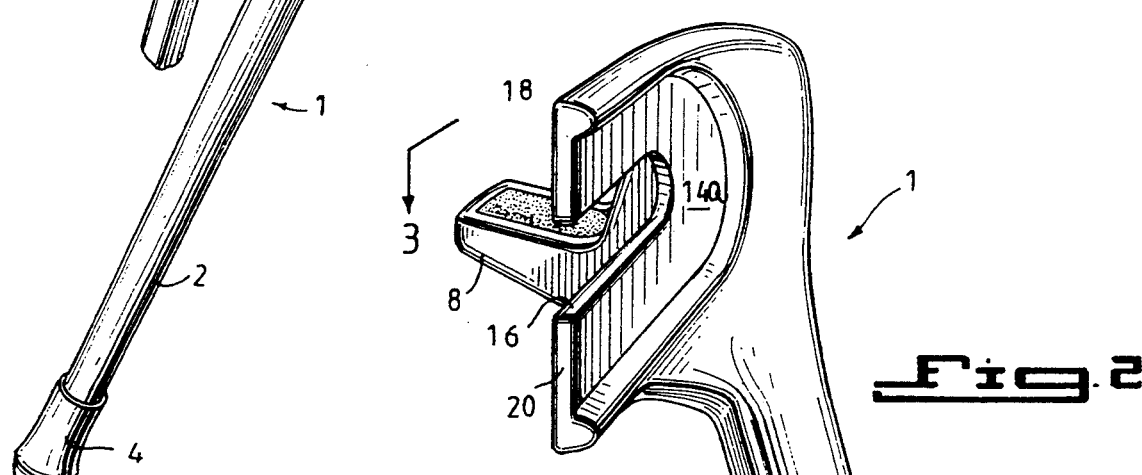
FIG. 2 is an enlarged, fragmentarily-illustrated, perspective view of the bicycle stand.

Referring now, in detail, to the appended drawings, and in particular, to FIGS. 1 and 2 thereof, therein illustrated is a novel bicycle stand of the present invention, generally designated by reference numeral 1. The stand 1 is an elongated leg member 2, the lower end of which is covered in a plastic or rubber ground-engaging tip 4. As seen clearly in FIG. 3, the upper end of leg 2 has an inwardly projecting, generally L-shaped shoulder 8. Shoulder 8 has a recessed dove-tail shaped channel 9 in which a generally L-shaped resilient plastic or rubber cushion 10 is mounted in a friction-fit manner.

Figure 3:
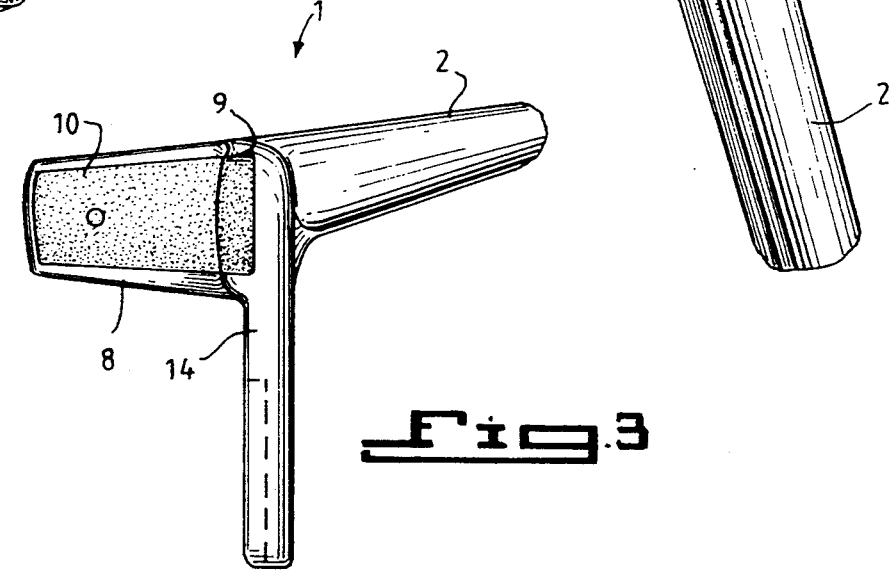
FIG. 3 is a plan view of the bicycle stand.

As seen best in FIGS. 2 and 3, a substantially planar tab 14 projects laterally or forwardly of the upper end of leg 2, approximately 90 degrees offset from shoulder 8. Tab 14 comprises a bifurcated member as defined by the U-shaped slot or cut-out 16 intermediate the top portion or leg 18 and the bottom portion or leg 20. Tab 14 has a recessed or stepped U-shaped inner face 14a of reduced width to reduce weight and to provide clearance for installations wherein the head of the crank arm is enlarged.

The above-described stand elements will be understood to comprise an integral preferably die-cast member (aside from cushion 10). As explained, a feature of the instant invention is that no supplemental or disparate means are required to attach the stand 1 to a bicycle, as this attachment is accomplished in a positive manner by means of the laterally directed tab 14 and yokeless leg shoulder 8, as will be described hereinafter. The stand may be constructed of any suitable metallic or non-metallic material such as cast aluminum, or the like, and in the interest of reducing its mass, the leg portion 2 may be tapered.

Stand attachment employs frame structure existing on all bicycles, a variation of which is shown in the installed example of FIG. 1, wherein pertinent well-known bicycle frame components are illustrated. The stand 1 is adapted to be attached to the bicycle frame 21 immediately adjacent the hub 24. As is recognized in the art, the transversely disposed hub 24 provides journal means for a spindle 26 to which the pedal cranks 28 are affixed. The exact configuration of the spindle and cranks will, of course, vary between makes and models of bicycles. Other frame structure usually includes a seat tube 30 and down tube 32. As is well-known, the rear wheel (not shown) is mounted at the end of a pair of laterally spaced-apart chain stay tubes 34, 34'. It is one of these chain stay tubes and the hub or spindle assembly that cooperate with specific components of the stand during its use.

As seen more clearly in FIGS. 4-6, the stand is applied to the initially moving the leg inner face toward the left-hand chain stay tube 34 until this tube is disposed on shoulder 8. Shoulder 8 provides support and prevents a bicycle from forward movement within the stand 1. Thence, the user moves the stand 1 forwardly to engage the hub 24 or crank arm spindle 26 within the tab slot or cut-out 16. As most clearly illustrated in FIG. 5, the planar tab 14 is disposed in a plane which is substantially offset from the longitudinal axis 40 of the leg 2. In this manner, when the tab 14 is captively retained between the crank arm 28 and hub 24 in a substantially vertical plane, the leg 2 will be positioned in the angular fashion, as shown in FIG. 5, to properly support the bicycle when leaned toward the direction of the stand 1. The offset of the plane of the tab 14 relative to the longitudinal axis 40 preferably falls within the range of 25-35 degrees, with a 30 degree offset having been found to properly accommodate many bicycles.

As shown clearly in FIG. 6, shoulder 8 and planar tab 14 form well defined legs of an L-shaped member at approximately 90 degree offset from each other, and the apex of the member, where the two legs meet, is located on the longitudinal axis of elongated leg member 2 and tilted so that neither leg is aligned or at right angles to said longitudinal axis.

With the foregoing structure in mind, it will be appreciated that a simple maneuver permits one to attach the present stand 1 to a bicycle frame whereafter, the vehicle is tilted laterally in the direction of the applied stand until the leg bottom tip 4 abuts the ground. The bicycle is then supported, with its weight upon the stand ensuring retention of the stand as the chain stay tube 34 bears against the cushion of shoulder 8, while the tab 14 is captively retained between the crank arm 28 and the hub 24.

Removal of the stand 1 is as simple as its attachment. One merely raises the bicycle from its leaning position so as to elevate the bottom tip 4 from the ground and thereafter urges the stand rearwardly to remove the tab 14 from the position as in FIGS. 4 and 5, whereupon the leg 2 is lowered to clear the tube 34 from its seated position on shoulder 8. The stand may then be stored wherever desired, such as on the bicycle itself. The elongated configuration and light weight of the device lends itself to ready attachment to one of the frame tubes, such as by the spring clips (not shown) as used to retain tire pumps or water bottles to bicycles.

Due to variations in bicycles in the length of the spindle 26 from the hub 24 and the diameter of the tubes 34, the stand 1 may require the weight of a bicycle to enable the stand to remain in the vertical position, thereby requiring the user to hold the stand 1 in the vertical position while attaching it to the bicycle. However, as can be appreciated, the use of a "yokeless" shoulder 8 also has the stand to accommodate a wide range of different bikes and sizes notwithstanding differently positioned and dimensioned tubes 34. In addition, the cushion 10 prevents scratching of the bike and tubes 34.

FIGS. 7-11 illustrate another embodiment of the bike stand wherein similar elements are provided with similar reference numerals except for the addition of a prime. This version differs from the embodiment of FIGS. 1-6 by providing a leg 2' of polygonal cross-section, a modified tip 4' and a modified planar tab 14' having a double stepped inner face 14a' which provides weight reduction for the stand and modified U-shaped slot-16' which, as a result, has a "dog-leg" like profile that serves to enable the stand to provide a more positive capture of, and engagement with, the bicycle spindle 26. As seen best in FIG. 10, the spindle 26 will be captured within the enlarged inner upper end of the slot 16 when the bike is in its full resting position on stand 1'. In order to then remove stand 1' it will be necessary to raise the stand slightly to enable spindle 26 to clear slot 16' and then allow the stand to be laterally shifted (to the left in FIG. 10) to effect disengagement thereof.

While several embodiments of this invention have been described, it is understood that many variations of this invention are possible without departing from the principles of this invention.

What is claimed is:

1. A portable removable stand for a bicycle said bicycle having a frame including a crank spindle and a chain stay tube, the stand comprising:

an elongated member having an upper portion and lower portion;

said upper portion having bicycle support means comprising an L-shaped member having well defined first and second legs whose apex where said legs meet is located at the top of and on the longitudinal axis of said elongated member, said legs being substantially offset 90 degrees from each other and tilted from said longitudinal axis so that neither of said legs is parallel to or at right angles to said longitudinal axis;

said first leg forming one edge of a planar tab extending laterally from said elongated member and having a slot therein which engages about said crank spindle;

said planar tab disposed essentially parallel to the plane of the bicycle frame when engaged about said crank spindle;

said second leg comprising a shoulder element which engages and supports thereon said chain stay tube, said shoulder element extending from said elongated member thereby being at a substantially 90-degree offset from the plane of said tab; whereby the combined engagement of said support means by the bicycle serves to transfer the weight of the bicycle to said elongated member and thence to the ground therebeneath.

2. The portable removable stand for a bicycle according to claim 1, wherein said stand comprises a rigid, unitary member.

3. The portable removable stand for a bicycle according to claim 1, wherein said planar tab projects radially from said elongated member.

4. The portable removable stand for a bicycle according to claim 1, wherein said tab slot is bounded by a recessed, U-shaped tab inner face.

5. The portable removable stand for a bicycle according to claim 3, wherein the plane of said planar tab is disposed between 25 to 35 degrees relative to the longitudinal axis of said elongated member.

6. The portable removable stand for a bicycle according to claim 1, wherein a generally L-shaped cushion is mounted on said first and second legs.

7. The portable removable stand for a bicycle according to claim 6, wherein said L-shaped cushion is mounted in a recessed channel in a friction-fit manner.

* * * * *